United States Patent [19]

Kopeika et al.

[11] Patent Number: 5,790,709
[45] Date of Patent: Aug. 4, 1998

[54] METHOD AND APPARATUS FOR THE RESTORATION OF IMAGES DEGRADED BY MECHANICAL VIBRATIONS

[75] Inventors: Norman S. Kopeika; Ofer Hadar; Itai Dror, all of Beer-Sheva, Israel

[73] Assignee: Ben-Gurion, University of the Negev, Israel

[21] Appl. No.: 795,110

[22] Filed: Feb. 6, 1997

Related U.S. Application Data

[63] Continuation of Ser. No. 388,608, Feb. 14, 1995, abandoned.

[51] Int. Cl.$^6$ .................................................. G06K 9/40
[52] U.S. Cl. ..................... 382/254; 348/342; 382/107
[58] Field of Search ..................... 382/254; 250/205; 356/446; 358/486; 359/574; 348/352, 342

[56] References Cited

U.S. PATENT DOCUMENTS

| | | | |
|---|---|---|---|
| 5,028,799 | 7/1991 | Chen et al. | 250/559.23 |
| 5,155,558 | 10/1992 | Tannenbaum et al. | 356/446 |
| 5,371,375 | 12/1994 | Stern et al. | 250/559.23 |
| 5,414,782 | 5/1995 | Carasso | 382/270 |
| 5,535,291 | 7/1996 | Spencer et al. | 382/254 |
| 5,537,226 | 7/1996 | Wolberg et al. | 358/486 |

*Primary Examiner*—Yon J. Couso
*Assistant Examiner*—Jayanti K. Patel
*Attorney, Agent, or Firm*—James M. Deimen

[57] ABSTRACT

A method and apparatus to restore images degraded by motion or vibration as characterized by the measurement of the relative motion between the object and the imaging device, calculation of the Optical Transfer Function (OTF) from the Line Spread Function (LSF), and applying a restoration filter M according to the following rule $$M(u,v) = \frac{H^*(u,v)}{H^*(u,v) \cdot H(u,v) + \gamma \cdot C(u,v) \cdot C^*(u,v)}$$

where H is the image motion OTF, C is the discrete Laplacian operator which is used to minimize the error and $\gamma$ is the convergence parameter of an iterative algorithm.

8 Claims, 5 Drawing Sheets

METHOD AND APPARATUS FOR THE RESTORATION OF IMAGES DEGRADED BY MECHANICAL VIBRATIONS

This is a continuation of application(s) Ser. No. 08/388,608 filed on Feb. 14, 1995, now abandoned.

FIELD AND BACKGROUND OF THE INVENTION

The present invention relates to a method and apparatus particularly useful to restore images which are degraded by any type of relative motion and vibrations between the object and the imaging apparatus.

Image motion is often the cause of limited resolution in reconnaissance, astronomy, robotics, machine vision and computerized vision systems. This degrading motion is often much more severe than the degradation caused by the optics and electronics. Even in the consumer areas, the stabilization of images captured by still or video cameras present a major challenge. Michael Shimazu summarized in "Photonics Spectra," PP. 68–72 (March 1993) the aspects of image stabilization and some of the commercially existing solutions. One of the approaches, utilized by Zeiss Optical for binoculars, applies a passive mechanical approach. In this system, a special suspension mechanism isolates the prism assembly from the binocular's body. To dampen the oscillations, the binoculars use an eddy-current electromagnet to provide negative feedback. Aside from the complexity of the mechanism, this system is limited to stabilize motion while looking straight ahead from a moving vehicle. The system, however, loses its efficiency observing scenes which are located 90° to the line of motion. In addition, slow-rolling motions are also hard to stabilize with this system.

Another approach, utilized by several camcoder manufacturers, is to apply on-line algorithms to "cut out" a specific portion of the image that remains in the viewer of the camera during motion, and then enlarge this portion to fill the entire field. The inherent problem with this approach is that the enlargement may considerably reduce the image quality. Other systems, developed by Canon and Sony, actually control the optical parts. A variable angle prism is controlled by piezoelectric angle-velocity sensors via a microprocessor. The system, however, is limited to compensation due to motions that do not exceed 1.50°.

A totally different approach is the restoration of the degraded images by utilizing mathematical algorithms to estimate the ideal image from the blurred one. Several attempts have been made by Tekalp et al, Proc. of ICA SSP-83, Vol. 2 (1985), Cannon: IEEE Trans. On Acoustics, Speech and Signal Processing, Vol. ASSP-24, No. 1 (1976), pp. 58–63, Gennery: J. Opt. Soc. Ameri., Vol. 63, No. 12 (1973), pp. 1571–1577, and Fabian et al: CVGIP: Graphical Models and Image Processing, Vol. 53, No. 5 (1991), pp. 403–412, to restore images by estimating the Optical Transfer Function (OTF) of the degradation process from the information present in the degraded image itself. These methods are very sensitive to noise and are limited to very few analytical degradation functions. Consequently, this cannot be applied for most practical situations in which motion may be a random process.

SUMMARY OF THE INVENTION

According to the present invention, there is provided a method to restore images degraded by motion. This method can be embedded as an on-line algorithm in a microprocessor which is an integral part of an imaging system. The restoration process involves the utilization of motion sensors attached to the imaging device (e.g. the camera or its platform). The information obtained from the sensors is utilized to estimate the Optical Transfer Function (OTF). Contrary to previously described systems in which the OTF is estimated from the image itself, this invention applies the precise data of motion, measured by the sensors, for the determination of the OTF. The process employs a least square estimation algorithm operating upon the degraded image which is characterized by a numerically calculated OTF obtained from the relative motion measured between the object and the imaging device.

The main advantage of this invention is that it can be applied to any random motion. The data obtained from the sensors is directly analyzed by the embedded microprocessor using numerical techniques. Another advantage of the invention is that it is less sensitive to additive noise present in the degraded image. Further features and advantages of the invention will be apparent from the description below.

MATHEMATICAL BACKGROUND

The mathematical discussion below provides the basis required to understand the details of the present invention. This background is described in the article "Numerical Calculation of MTF for Image Motion: Experimental Verification" by O. Hadar, et al., SPIE Vol 1697 (1992).

Let $x(t)$ be the relative displacement between object and sensor beginning at time $t_s$ and ending at time $t_s+t_e$ where $t_s$ is measured from the instant the sensor is first exposed. The Line Spread Function (LSF) of the motion is the Probability Density Function (PDF) or the histogram of $x(t)$. The intuitive explanation for this determination is the following. Image motion causes the system line spread image response to move spatially. Such motion can be described by a histogram of the LSF, where frequency of occurrence of a given portion $x(t)$ is depicted as a function of x during the time interval $(t_s, t_s+t_e)$. This histogram is the LSF itself. $t_s$ is a random variable representing initial exposure time and it is uniformly distributed according to $f_s(t)=1/t_e$.

Denoting real roots of $x_0$ by $t_n$:

$$(t_s < t < t_s+t_e) x_0 = x(t_1) = \ldots = x(t_n) = \ldots$$

It is shown that:

$$f_x(x) = f_t(t) * [1/|x'(t_1)| + \ldots + 1/|x'(t_n)| + \ldots] = 1/t_e * [1/|x'(t_1)| + \ldots + 1/|x'(t_n)| + \ldots ] (t_s < t < t_s+t_e)(d_{min} < x < d_{max})$$

where $x'(t)$ is the derivative of $x(t)$ and $f_x(x)$ is the PDF, and d is the spatial extent of the blur.

The lower and the upper limits, respectively, for x are results of minimum and maximum displacement between object and sensor. The PDF or histogram $f_x(x)$ represents the line spread function. The LSF is equal to $f_x(x)$ and the OTF is the 1-D Fourier transform of the LSF:

$$OTF(f) = \int_{\infty}^{-\infty} f_x(x)\exp(-j2\pi fx)dx$$

where f is spatial frequency.

Thus, LSF for image motion can be determined from a histogram of the motion, and the resulting OTF for such motion is given by the last equation.

DESCRIPTION OF THE PREFERRED EMBODIMENT

Figure 1:
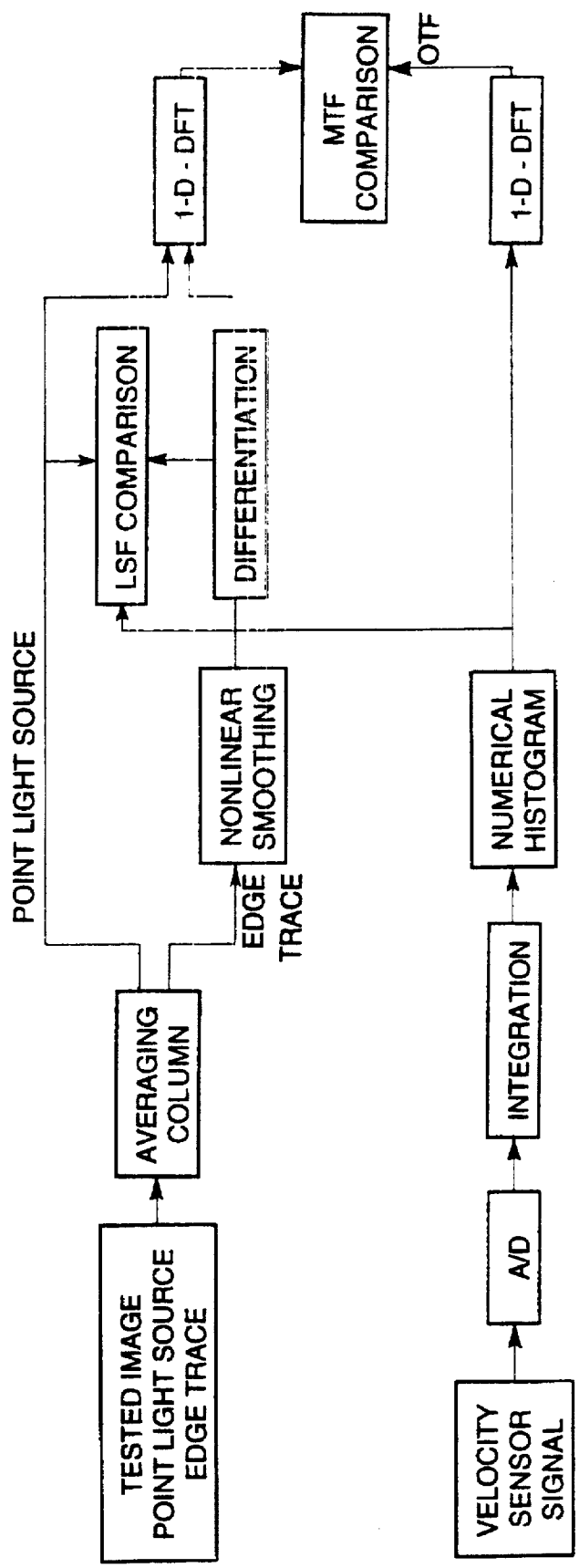
FIG. 1 is a block diagram of the method for obtaining the degradation function from the motion sensor and image.

The first element of the invention is the calculation of the Line Spread Function (LSF) and the Optical Transfer Function (OTF). In FIG. 1, a block diagram of the method for obtaining the degradation functions from the motion sensor is described. The figure also includes the experimental verification of the process by comparing the Line Spread Functions (LSF) and the Optical Transfer Functions (OTF) obtained from the signal of the movement sensor, and the same functions obtained from the image itself.

1. The object is imaged continuously with a video camera and focused so that the image of the light point source is less than 1 pixel on the image monitor. The amount of light incoming into the camera is controlled so the image is not saturated.
2. The field of view of a picture element is determined by taking a frozen picture of a rule and finding the number of pixels it occupies in the image plane. This task is very important for scaling the system so that it can be possible later on to compare LSF from the image and sensor.
3. The time integration $t_e$ option is chosen.
4. The camera now works in a single-frame mode, and the data of the vibrated image is transferred to the image processing unit. The data from the motion sensor is sent continuously to the computer.
5. The desirable picture area is chosen. This area does not include the entire CCD array but only a small portion of it around the blurred image in the case of the point light source and around the border between the white and black in the edge trace. At this time the A/D converter digitizes the image motion for the exact time of the exposure.
6. The first mathematical processing is performed on the sensor signal. This includes the integration of the velocity to obtain the displacement of the image of the object.
7. The following calculations are performed:
    a. numerical histogram of the displacement to determine the LSF according to image motion.
    b. point light source response in which the picture of the blurred image along the columns is averaged to obtain a 1-D PSF, which is the LSF from the picture.
    c. edge trace, in which the process of obtaining the LSF function is a little different from the case of the point light source: (1) find the center of the window including the edge trace (the algorithm is based on finding the maximum derivative of one row to find the center position in the x axis); (2) average the image in the accepted window-column averaging; (3) operate a nonlinear smoothing on the averaged gray level; and (4) find the derivative of the accepted vector to obtain the LSF function.
    d. comparison between both LSF functions, image against sensor.
    e. Fourier transformation of the LSF to obtain OTF and comparison of the experimental results to the analytical one.

Figure 2:
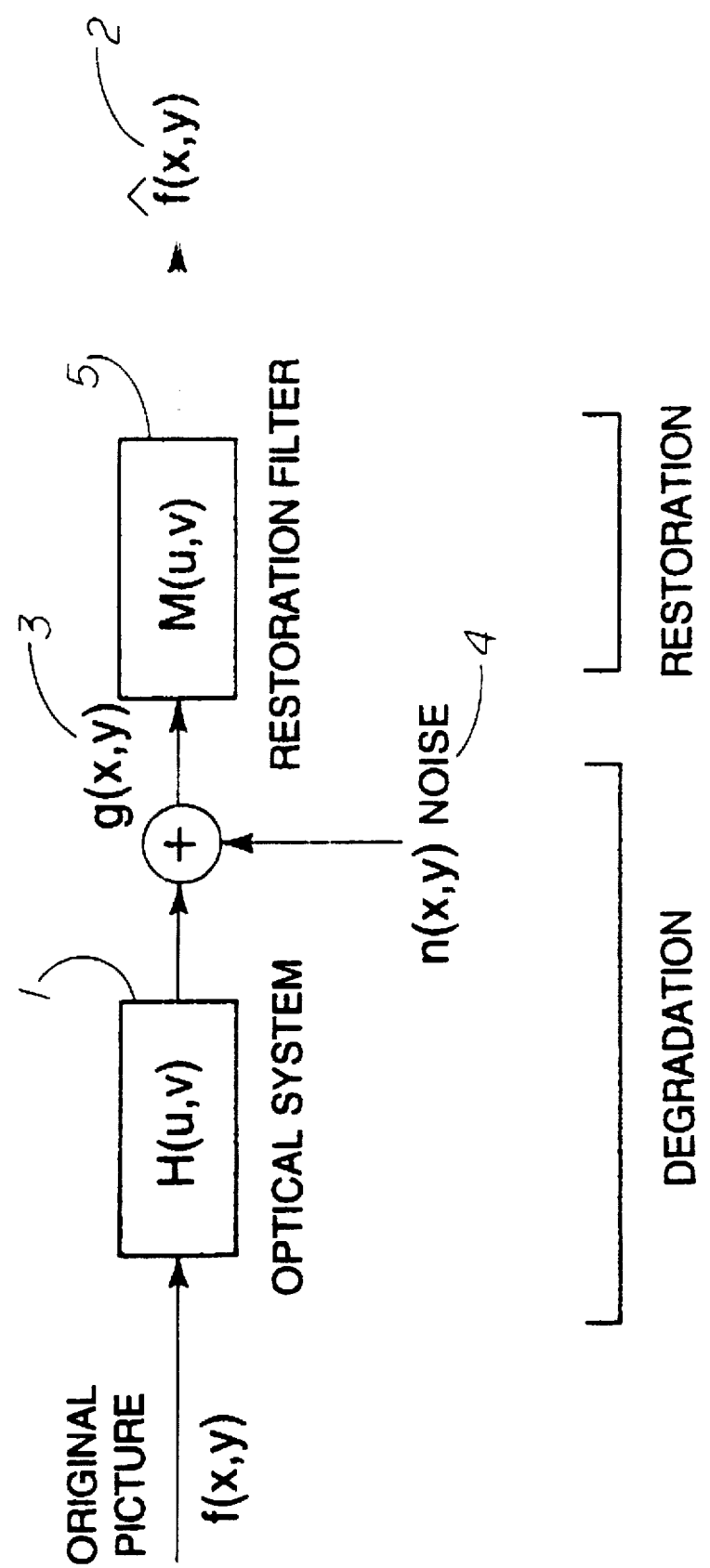
FIG. 2 is a block diagram of the restoration process.

The second element of the invention is an application of the Constrained Least Squares (CLS) filter in conjunction with the calculated OTF to restore the blurred image. The restoration process is illustrated in FIG. 2 where 1 denotes the degradation system H characterized by the OTF. The restored image 2 (f) is obtained by passing the degraded image 3 (g) which may also contain additional noise 4 (n) through the filter 5 (M). The filter M is calculated in the frequency axes u and v by:

$$M(u,v) = \frac{H^*(u,v)}{H^*(u,v) \cdot H(u,v) + \gamma \cdot C(u,v) \cdot C^*(u,v)}$$

where H(u,v) is the image motion OTF, C(u,v) is the discrete Laplacian operator which is used for the minimization of the error and γ is the convergence parameter of the iterative algorithm. The symbol * denotes the conjugate operator (matrix).

Figure 3:
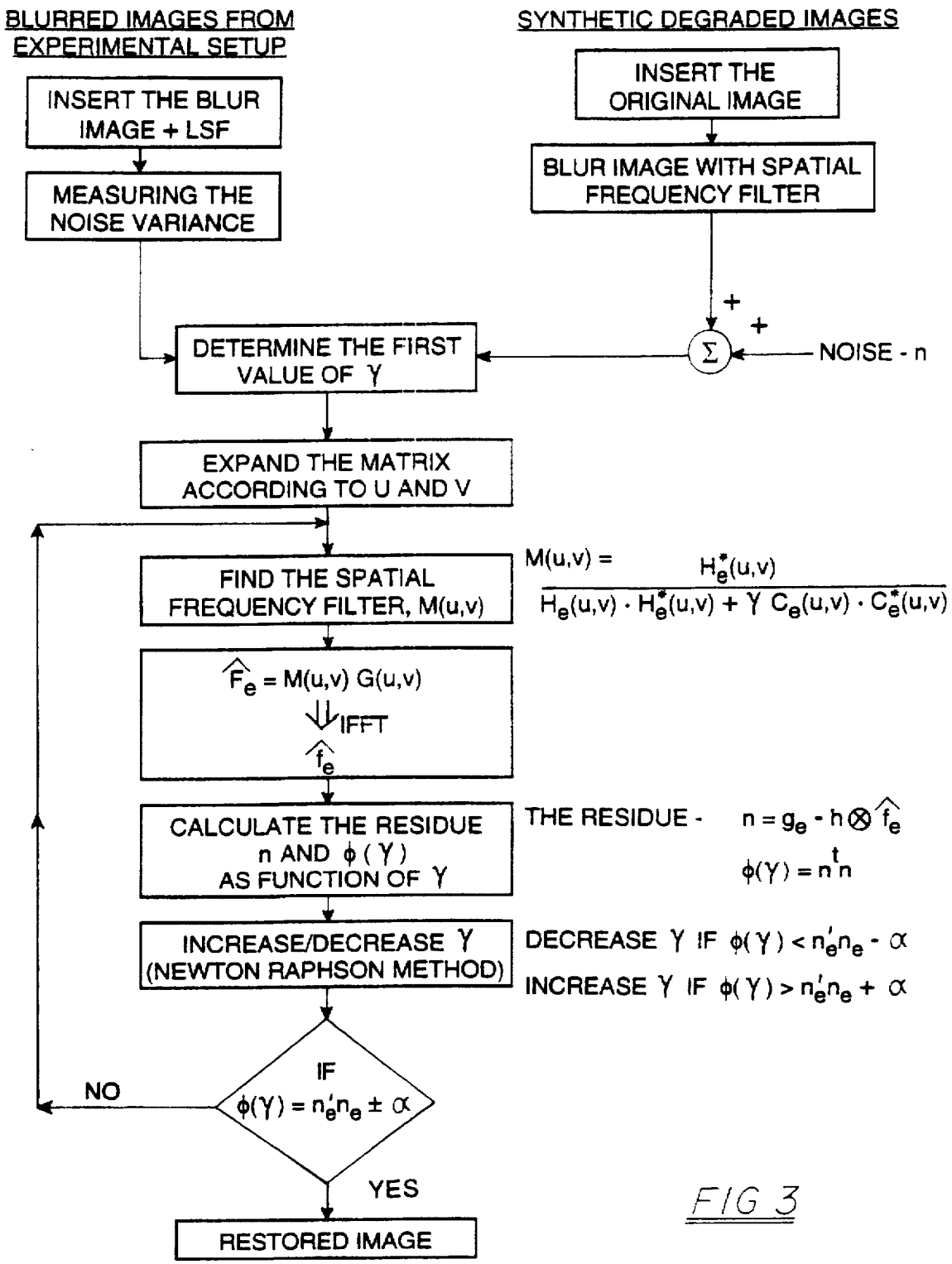
FIG. 3 is a flow chart of the restoration process.

FIG. 3 illustrates the entire process to restore the image. This figure includes the two input possibilities to the system, synthetically degraded images in a computer and images blurred from an actual experimental setup. The subscript e of H and C defines the extended matrices of the size u·v. $g_e$ is the blurred image with the additive noise and $\hat{f}_e$ is the restored image which changes during the iterative process until the required convergence criterion is satisfied.

The convergence process is determined by the content of noise in the image. For gaussian noise, it is enough to know the noise variance. In a practical system, this value can be measured directly. The condition for convergence is given by, $$\rho(\gamma) = n^t \cdot n$$

where t denotes the transposed matrix operator.

The purpose of the iterative algorithm is to find a γ that will obey this equation within the boundary error ±α, where α is suggested to be 0.01(n$^t$n).

Figure 4:
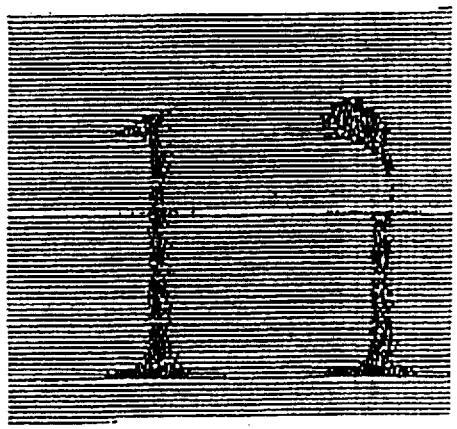
FIGS. 4 and 5 are illustrations of restored images blurred by low- and high-frequency vibrations.
Figure 4:
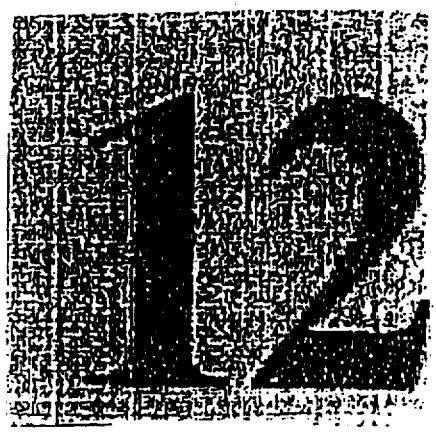
Figure 5:
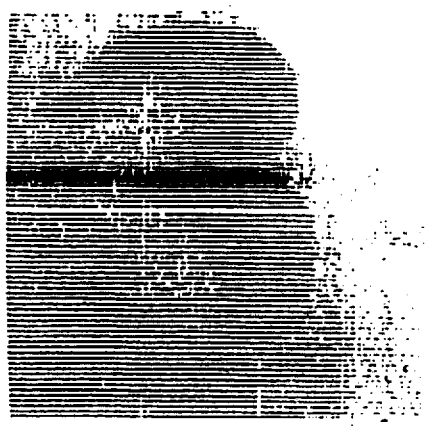
Figure 5:
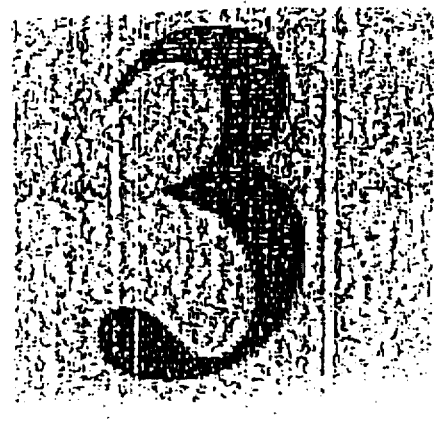

FIG. 4 illustrates the restoration of an image degraded by high-frequency vibration, using the described technique. Similar results are obtained for low-frequency vibration as illustrated in FIG. 5.

Figure 6:
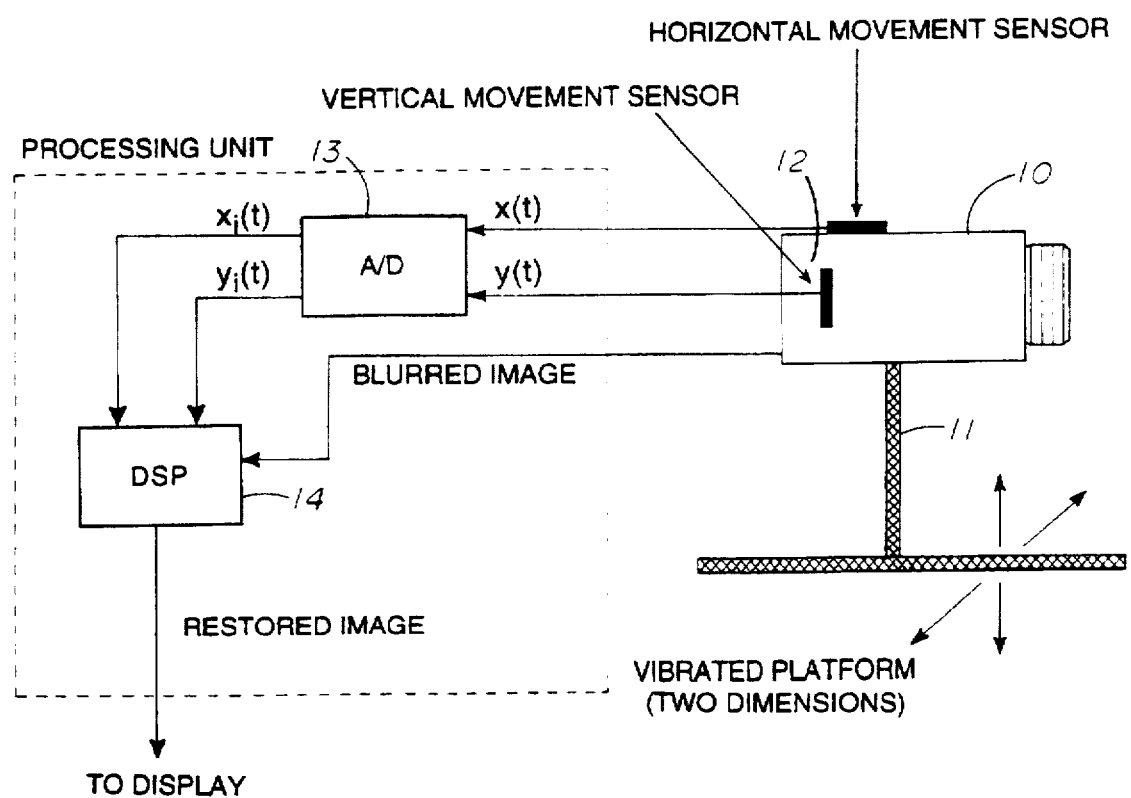
FIG. 6 illustrates a practical system to restore an image degraded by a two dimensional motion.

The described new method is not limited to restoration of images degraded by motion occurring in a single dimension. FIG. 6 illustrates a practical system, according to the invention, in which motion takes place in two dimensions. A CCD camera 10 is mounted on a platform 11 which can vibrate randomly in all directions. On the camera 10 there are two movement sensors 12, one for the horizontal direction and the other for the vertical direction. Image motion that occurs to the camera can be divided into two orthogonal axes, horizontal and vertical. The analog signals x(t) and y(t) from the sensors 12 are transformed to digital forms $X_i(t)$ and $y_i(t)$ by using an Analog to Digital (A/D) device 13. The image from the camera is also digitized and the three signals are fed to a Digital Signal Processor (DSP) 14. The restored image can be produced with this equipment, according to the new invention, in real time.

What is claimed is:
1. A method to restore an image degraded by relative mechanical vibration motion between the object and the imaging device, such method comprising the steps of:
    determining the relative mechanical vibration motion as a function of time x(t);
    calculating the Line Spread Function (LSF) by generating the displacement histogram $f_x(x)$;

calculating the Optical Transfer Function (OTF) according to the rule $$OTF(f) = \int_{\infty}^{-\infty} f_x(x)\exp(-j2\pi fx)dx$$

and applying a restoration filter M according to the rule $$M(u,v) = \frac{H^*(u,v)}{H^*(u,v) \cdot H(u,v) + \gamma \cdot C(u,v) \cdot C^*(u,v)}$$

where H is the said OTF, C is the discrete Laplacian operator and $\gamma$ is a parameter which minimizes the variance of noise present in the degraded image.

2. The method of claim 1 wherein the relative mechanical vibration motion is determined by a motion sensor.

3. The method of claim 1 wherein the imaging device is a video camera.

4. The method of claim 1 wherein the imaging device is a still camera.

5. The method of claim 1 where the relative mechanical vibration motion is two-dimensional and in which the calculations are performed on both dimensions.

6. Apparatus to restore an image degraded by relative mechanical vibration motion between the object and the imaging device, such apparatus comprising:

at least one motion sensor to determine the relative mechanical vibration motion as a function of time x(t);

means to calculate the Line Spread Function (LSF) by generating the displacement histogram $f_x(x)$;

means to calculate the Optical Transfer Function (OTF) according to the rule $$OTF(f) = \int_{\infty}^{-\infty} f_x(x)\exp(-j2\pi fx)dx$$

and to calculate a restoration filter M according to the rule $$M(u,v) = \frac{H^*(u,v)}{H^*(u,v) \cdot H(u,v) + \gamma \cdot C(u,v) \cdot C^*(u,v)}$$

where H is the OTF, C is the discrete Laplacian operator and $\gamma$ is a parameter which minimizes the variance of noise present in the degraded image.

7. The apparatus of claim 6 wherein the imaging device is a video camera.

8. The apparatus of claim 6 wherein the imaging device is a still camera.

* * * * *